June 9, 1925.                                                                  1,541,142
R. W. HILTON ET AL
GLASS APPARATUS
Filed Dec. 3, 1920                5 Sheets-Sheet 1

June 9, 1925.  
R. W. HILTON ET AL  
GLASS APPARATUS  
Filed Dec. 3, 1920

R. W. HILTON ET AL

GLASS APPARATUS

Filed Dec. 3, 1920

Inventors
R.W. Hilton and
J.L. Graham
By
Lacy & Lacy, Attorneys

Patented June 9, 1925.

1,541,142

UNITED STATES PATENT OFFICE.

ROBERT W. HILTON, OF SMETHPORT, AND JOHN L. GRAHAM, OF REYNOLDSVILLE, PENNSYLVANIA; SAID GRAHAM ASSIGNOR TO SAID HILTON.

GLASS APPARATUS.

Application filed December 3, 1920. Serial No. 428,116.

*To all whom it may concern:*

Be it known that we, ROBERT W. HILTON and JOHN L. GRAHAM, citizens of the United States, residing at Smethport and Reynoldsville, respectively, in the counties of McKean and Jefferson and State of Pennsylvania, have invented certain new and useful Improvements in Glass Apparatus, of which the following is a specification.

This invention relates to glass apparatus and more particularly to an improved glass drawing furnace.

Where glass cylinders are drawn from drawing pots, it is customary to heat and drain the pots after the drawing operation so as to remove all of the residue from the operation after which the pots are again supplied with a charge of molten glass for the subsequent drawing operation. With the present types of drawing furnaces where means such for example as a draining chamber is provided in conjunction with the drawing furnace proper, considerable difficulty is experienced in retaining the heat within the draining chamber while the pot is being drained, and in preventing the radiation of heat about the pot when in drawing position, with the result that some residue may remain within the pot after the draining operation, and during the drawing operation, the cylinder being drawn is liable to be subjected to varying degrees of temperature, so that the final product is not always uniform. It is therefore desirable that means be provided whereby the heat may be controlled in the operation of a furnace of this general class so that during the draining operation, the pot being drained will be subjected to a suitable uniform degree of temperature, and further so that during the drawing operation the heat supplied to the pot may be regulated and the heated air currents controlled in a manner to provide against subjection of the cylinder being drawn to varying degrees of temperature and also to maintain the molten glass within the pot at a constant degree of temperature. The present invention therefore has as one of its primary objects to provide an apparatus embodying a novel arrangement and construction of drawing and draining furnaces whereby these advantageous results may be obtained.

More specifically, it is another object of the invention to so construct the draining furnace that a pot to be drained may be readily introduced into and withdrawn from the draining chamber of the furnace, and during the draining operation, may be completely enclosed so as to be subjected to a uniform degree of temperature.

The invention also has as one of its objects to provide a novel construction of pot-supporting carriage and a novel means for mounting the same so that the pots supported by the carriage may be each alternately positioned in operative relation to the drawing furnace and to the respective draining furnace.

Another important object of the invention is to provide a novel arrangement of draining and drawing furnaces, the arrangement being such that the pots supported by the carriage above referred to may in the movement of this carriage from one position to another, be successively positioned in operative relation to respective ones of the draining furnaces and to the drawing furnace so that while one of the pots is in drawing position and the drawing operation is being carried on, the other pot will be in draining position, the operation as a whole being greatly facilitated and expedited by reason of this arrangement.

Another important object of the invention is to provide a novel construction of drawing furnace adapted to be moved into and out of elevated position and when elevated to enclose within its upper portion the pot which is in drawing position, the furnace being provided with means within its upper portion providing a rest for the pot whereby to relieve the supporting trunnions for the pot of shocks and strains at the time the molten glass is ladled into the pot. In this connection it is also an object of the invention to so construct the drawing furnace that the same may be adjusted with relation to the pot supporting means and to the pot supported by said means so as to control or regulate the passage of heated air currents to or about the said pot.

A further important object of the invention is to so construct the drawing furnace that when the furnace is elevated to enclose the pot which is in position for the drawing operation, this particular pot will be automatically leveled and held stationary in a level position so long as the furnace is in the position stated and consequently during the entire drawing operation.

The drawings illustrate a preferred embodiment of the invention but it is to be understood that various modifications may be made without departing from the spirit of the invention.

Figure 1:
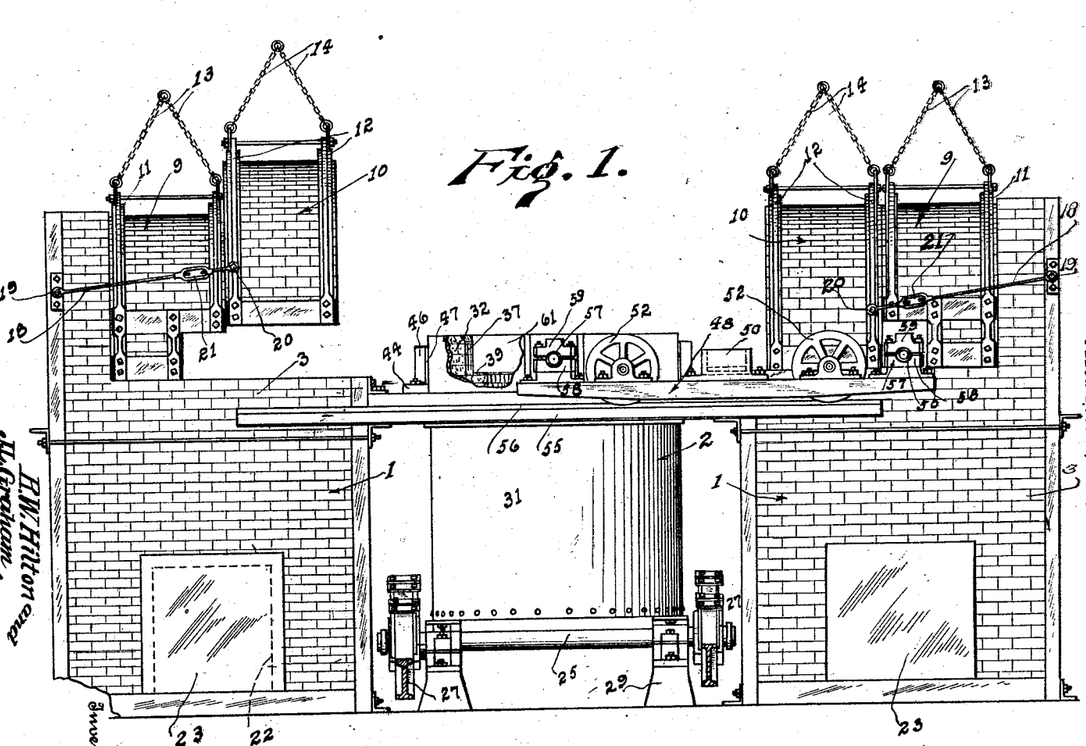
Figure 1 is a view in front elevation of the apparatus embodying the present invention.

Generally speaking, the apparatus comprises two spaced draining furnaces, a drawing furnace arranged between the draining furnaces, and pot supporting means movable in such a manner as to alternately position the pots supported thereby within the respective draining furnaces and in operative relation to the drawing furnace, and in the drawings the draining furnaces are indicated in general by the numeral 1 and the drawing furnace by the numeral 2. The draining furnaces are of counterpart construction and therefore a description of one will suffice for both. Each draining furnace may be of rectangular or any other desired form and of any suitable material such for example as fire brick, each furnace, in the illustrated embodiment of the invention, comprising a front wall 3, a rear wall 4, an outer side wall 5, and inner side wall 6, and a bottom 7, the furnaces being arranged in spaced relation with their inner side walls 6 presented toward each other. The front and rear walls and the inner side walls 6 are preferably of uniform height whereas the outer side wall 5 is extended above the first-mentioned walls and is provided in its upper portion with a flue 8 for the escape of burned gases. The upper portion of the interior of each of the draining furnaces constitutes the heating and draining chamber, and in order to close the top of the furnace and provide this chamber, the furnace is provided at its open top with two arches one indicated by the numeral 9 and the other by the numeral 10. These arches may be of any desired construction although preferably of refractory brick built up within suitable frame structures 11 and 12 respectively, the frame structures being provided individually with bails indicated respectively by the numerals 13 and 14 whereby the respective arches may be lifted from position resting upon the walls of the furnace, although the arch 9 of each furnace is intended to be relatively stationary. This arch 9 is open at its opposite sides except were at one side it is closed by the projecting upper portion of the outer side wall 5 of the furnace, the intake end of the flue 8 being so located that when this arch is in place resting at its ends upon the front and rear walls of the furnace, the said end of the flue will be immediately below the roof of the arch. The arch 10 has one of its sides open, and when the arch is in position resting upon the top of the furnace, registers with the adjacent open side of the respective arch 9. The other side of the arch 10 or in other words that side which is presented toward the drawing furnace, is enclosed by a wall 15 which wall, in the lowered position of the arch, rests upon the top of the inner side wall 6 of the furnace. The ends of the arch 9 at the last-mentioned open side of the arch are recessed as at 16 so as to receive the bearings for the trunnions which support the drawing pots as will presently be explained, these bearings being adapted to fill the recesses 16 when the pot supported thereby is located within the draining chamber. At this point it will be evident that when both arches 9 and 10 are in lowered position, the furnace will be completely closed except for the outlet flue 8. Heat is supplied to a pot in draining position within the draining chamber of either furnace by one or more fuel burners 17 which lead through the wall 6 of the furnace and are presented in an upward direction so as to discharge the flame in the general direction of the top and side wall 5 of the furnace. While the arch 9 of each furnace is as above stated normally stationary, the arch 10 is adapted to be raised and lowered so as to permit of the passage of the respective drawing pot into the furnace and to further permit of the withdrawal of the pot from the furnace. In order that the arch 10 may be guided in this movement, sway rods 18 are pivotally connected at their outer ends as at 19 to the outer front and rear corners of the furnace and, as at 20, to the frame structure 12 of the respective arch 10. When the arch 10 is in lowered position the sway rods 18 will extend downwardly at an angle from their first to their last mentioned ends, as shown in Figure 1 of the drawings, and the length of these rods may be adjusted by means of interposed turn buckles 21 so that when the said arch 10 is in the lowered position stated its open side will rest snugly against the adjacent open side of the arch 9. When an upward pull is exerted upon the bail 14 however, in lifting the arch 10, the arch will be caused to slightly recede from the arch 9 due to the outward travel of the pivot 20 for the sway rods, and thus the contacting side of the arch 10 will readily clear the corresponding side of the arch 9 in such movement of the first mentioned arch. It will be evident that any suitable means may be employed for elevating the arches 10 of the two furnaces. In order that the drainings from the pots may be removed from the furnace floor 7 whenever required, each of the furnaces is provided in its front wall with an opening 22 closed by a suitable door 23.

The drawing furnace 2, the construction of which will presently be described, is bodily supported upon bearings 24 secured to its bottom at diametrically opposite points and fitting a shaft 25, the ends of which shaft are journaled in bearings 26 fixed upon the rear ends of parallel beams 27 which beams are pivotally mounted, as at 28, upon pillow blocks 29 upon a foundation upon which the apparatus is built. The forward ends of the beams 27 support between them a weight box indicated by the numeral 30. In this manner the weight of the drawing furnace is counterbalanced, and by tilting the beams 27, the furnace may be readily bodily elevated or lowered as occasion requires. This supporting means is mounted between the draining furnaces 1 and is so positioned that the furnace 2 supported thereon will be located in equi-distant spaced relation between the draining furnaces.

Figure 3:
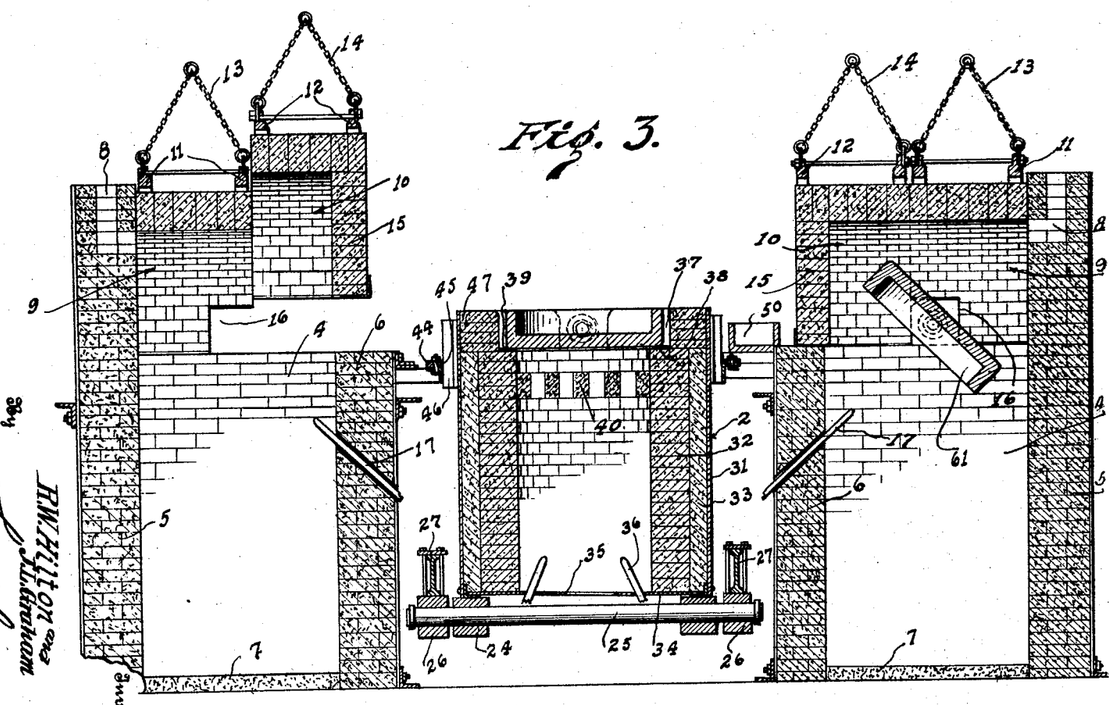
Figure 3 is a vertical longitudinal sectional view through the apparatus, one of the pots being in draining position and the other in drawing position.
Figure 4:
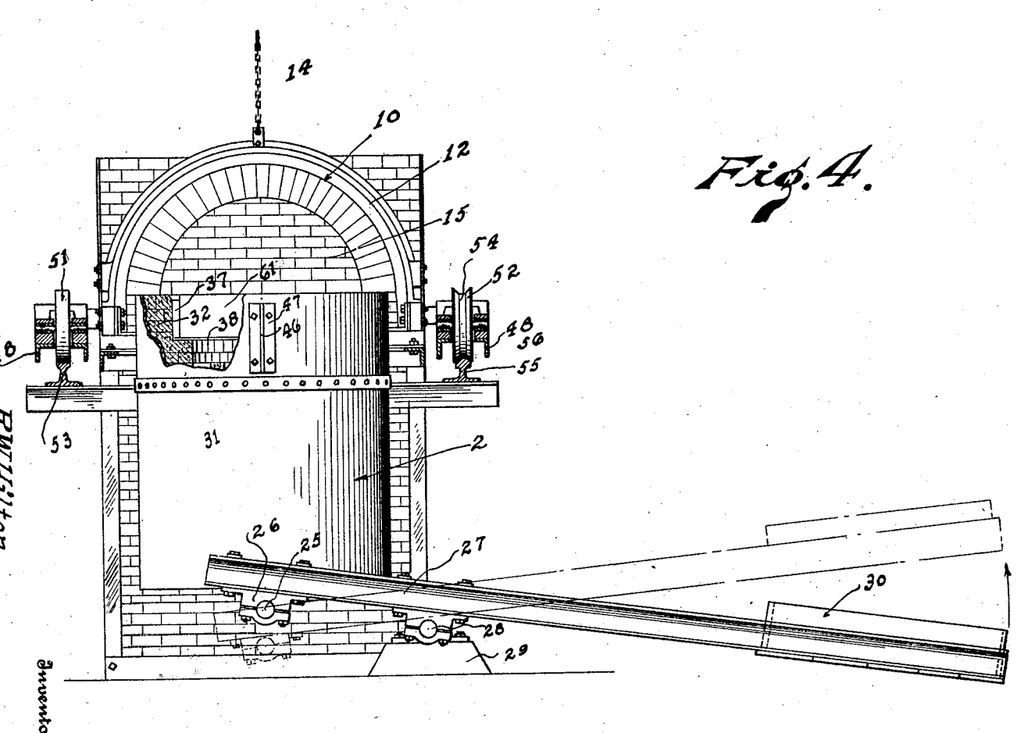
Figure 4 is a vertical front to rear sectional view through the apparatus taken in a plane to one side of the drawing furnace, a portion of the furnace being shown in section.
Figure 5:
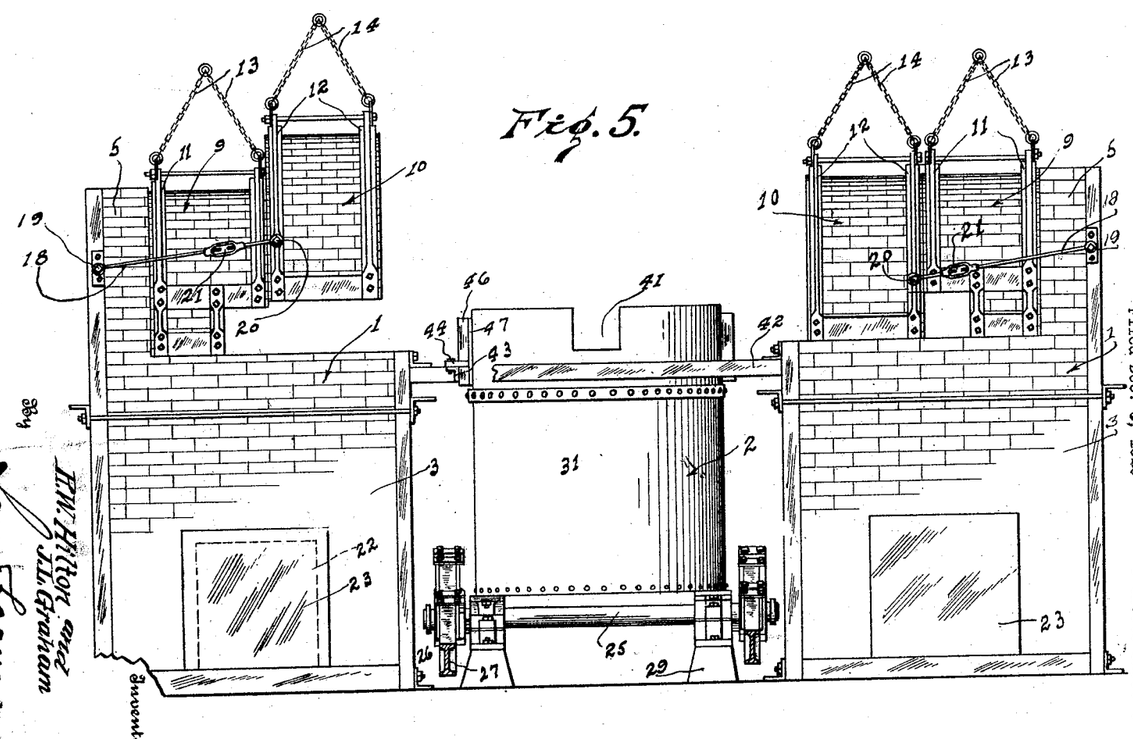
Figure 5 is a view similar to Figure 1 with the carriage for the pots omitted so as to better illustrate the construction of other portions of the furnace.

The drawing furnace 2 comprises an outer shell 31 which is preferably of heavy sheet metal and which surrounds a wall 32 built up of fire brick or other refractory material, a lining 33 of some heat insulating material being interposed between the shell 31 and the wall 32, as most clearly shown in Figure 3. The furnace is provided with a bottom 34 which is likewise preferably of heavy sheet metal and united at its periphery to the lower end of the shell 31. This bottom wall is provided preferably centrally with a draft opening 35 for the entrance of air in sufficient volume to support combustion at the burners 36 which burners project upwardly through the bottom 34 in a manner to permit of the up and down movement of the furnace without disturbing the burners. This furnace is illustrated in the drawings as of general cylindrical form, but it will be understood that it may be of any other desired shape and also that it may be constructed in some other manner than as shown in the drawings. However, the furnace is in any event open at its top and somewhat increased in diameter interiorly so as to provide a pot-receiving chamber 37 within which the pot which is in drawing position is to be substantially completely housed when the drawing furnace is in its elevated position. In interiorly enlarging the upper end of the furnace to provide the chamber 37, an annular ledge or shoulder 38 is formed, and disposed upon this ledge or shoulder is a ring 39 of asbestos or any other suitable heat insulating and relatively yieldable material upon which the peripheral portion of the bottom of the drawing pot may rest when the furnace is elevated as shown in Figure 3 so as to steady the pot and hold it in true level position and stationary during the drawing operation. If it is found necessary or desirable to effect a distribution of the heated air currents from the burners 36 before they reach the bottom of the drawing pot housed within the chamber 37, a baffle device as for example checker work 40 may be constructed within the upper portion of the furnace. For the purpose of accommodating the bearings for the pot trunnions when the pot is in drawing position and the furnace is elevated, and as will presently be more specifically described, the wall of the furnace is provided at diametrically opposite points at its front and rear with recesses 31 opening through the top of the wall. Beams 42 extend between the draining furnace at the front and rear of the drawing furnace, and other beams 43 extend between the said beams 42, each beam 43 having fixed upon it a guide 44 having a notch or groove 45 slidably receiving a flange 46 upon a slide 47 secured upon the respective side of the drawing furnace wall. These flanges, working in the notches or slots, serve to guide the drawing furnace in its up and down movement and to maintain the furnace in a true vertical position.

The pot-supporting means of the apparatus comprises side sills 49 connected between their ends by a heavy box beam 50 the open side of which is presented upwardly so that the beam constitutes a trough to receive water whereby the beam will be prevented from becoming heated to such a degree of temperature as to warp or become otherwise distorted. The truck is supported by wheels 51 and 52, the wheels 51 having plain peripheries and being supported for travel upon a track 53 mounted at the rear side of the apparatus and extending between the draining furnaces and rearwardly of the drawing furnace. The tread of the rail 53 is flattened and the peripheries of the wheels 51 travel freely over the said tread. The wheels 52 have grooved peripheries 54 which fit the substantially V-shaped tread 55 of a rail 56 which extends along the front of the apparatus between the said draining furnaces. At this point it will be understood that the engagement of the wheels 52 with the rails 56 will serve to prevent forward or rear displacement of the truck in its travel along the rails and on the other hand the form of the peripheries of the wheels 51 and tread of the rail 53 is such that none of the truck wheels will bind against their respective rails should there be any unevenness in the parallelism of the rails or should there be any expansion of the parts because of the heat to which they are subjected. By reference to Figure 2 of the drawings it will be observed that the box beam 50 extends in a front to rear direction between the adjacent sides of the draining furnaces and that due to its location substantially midway between the ends of the side sills 49 upon which it is mounted and which it connects, the end portions of these sills may straddle the adjacent draining furnaces when the truck is shifted to either limit of its travel along the rails upon which it is supported. Mounted upon the ends of the sills 49 of the truck 48 are bearings 57 each comprising a lower member 58 of substantially trough-like formation, and cap members 59 which are bolted or otherwise secured, preferably in a flexible manner, to the upper side of the member 58 at the ends thereof, the said member 58 and the cap members 59 being formed to accommodate a trunnion 60 provided at the respective side of the drawing pot to be supported, the said pot being indicated by the numeral 61. In this manner the truck is adapted to support two bearing pots, and the pots are supported in such a manner that when either pot is in the respective draining furnace, it may be tilted to discharge its contents. As above stated the members 58 of the bearings 57 are substantially of trough-like form so that they may be adapted to contain a quantity of water for the purpose of preventing them being raised to a high degree of temperature by heat radiated or conducted from the respective drawing pots.

By reference to the several figures of the drawings it will be observed that the pots are supported by the truck in such spaced relation that when either pot is in the drawing position, the other pot will be positioned within the draining chamber of the respective draining furnace. Thus by alternately shifting the truck 48 to the limit of its movement in the direction of either draining furnace, the pots will be alternately brought into drawing and draining positions, and while one pot is being used during the drawing operation, the other pot will be draining preparatory to receiving a charge of molten glass for a subsequent drawing operation. Before the carriage is shifted to bring either drawing pot into position within the draining chamber of the respective draining furnace, the arch 10 of that furnace is elevated to substantially the position shown at the left in Figures 1 and 3 of the drawings, so as to admit the respective pot as the carriage 48 is shifted to the limit of its movement in the direction of this particular furnace. As soon as the pot has been brought to position within the draining chamber, the arch 10 is lowered, and the trunnions of the pot are then rotated so as to bring the pot to the tilted or discharging position shown at the right in Figure 3 of the drawings, in which position the open side of the pot will be presented directly toward the blast from the burner or burners 17. Thus the flames from this burner or burners will play against the interior of the pot and completely melt away any residue of glass remaining in the pot after the drawing operation. After the pot has been drained, its trunnions are rotated so as to bring it to a normally upright position, and then after the arch 10 has been again elevated, the truck 48 may be shifted so as to withdraw the pot from the draining chamber and bring it to position where it may receive a charge of molten glass and where it may be employed in the drawing operation which is to follow. When the pot is in this position, it is directly over the open upper end of the drawing furnace 2, the said furnace being at such time in a lowered position. Before a charge of molten glass is ladled into the pot, the drawing furnace is elevated through the tilting of the beams 27 upon which it is supported, and as the furnace is lifted the shoulder 38 or more specifically the ring 39 upon the shoulder will be brought into engagement with the peripheral portion of the under side of the pot. In this manner the pot is firmly braced and steadied and maintained in a horizontal or level position while receiving the charge of molten glass and during drawing operation and furthermore, due to the support afforded the pot, its supporting trunnions are relieved of strain and shock when the molten glass is ladled into the pot. The heat from the drawing furnace is evenly distributed over the bottom of the drawing pot while the pot is in drawing position, and inasmuch as the pot is enclosed within the chamber 37 in the top of the furnace, the heat will be retained and it will be kept uniform so that the drawing operation may be most efficiently and satisfactorily performed. If desired, heated air currents may be permitted to pass up about all sides of the drawing pot by slightly lowering the furnace at any period during the drawing operation, whereupon a passageway for the said currents will be established between the under side of the pot and the ring 39 which was previously in sealing contact with the said under side of the pot.

Figure 2:
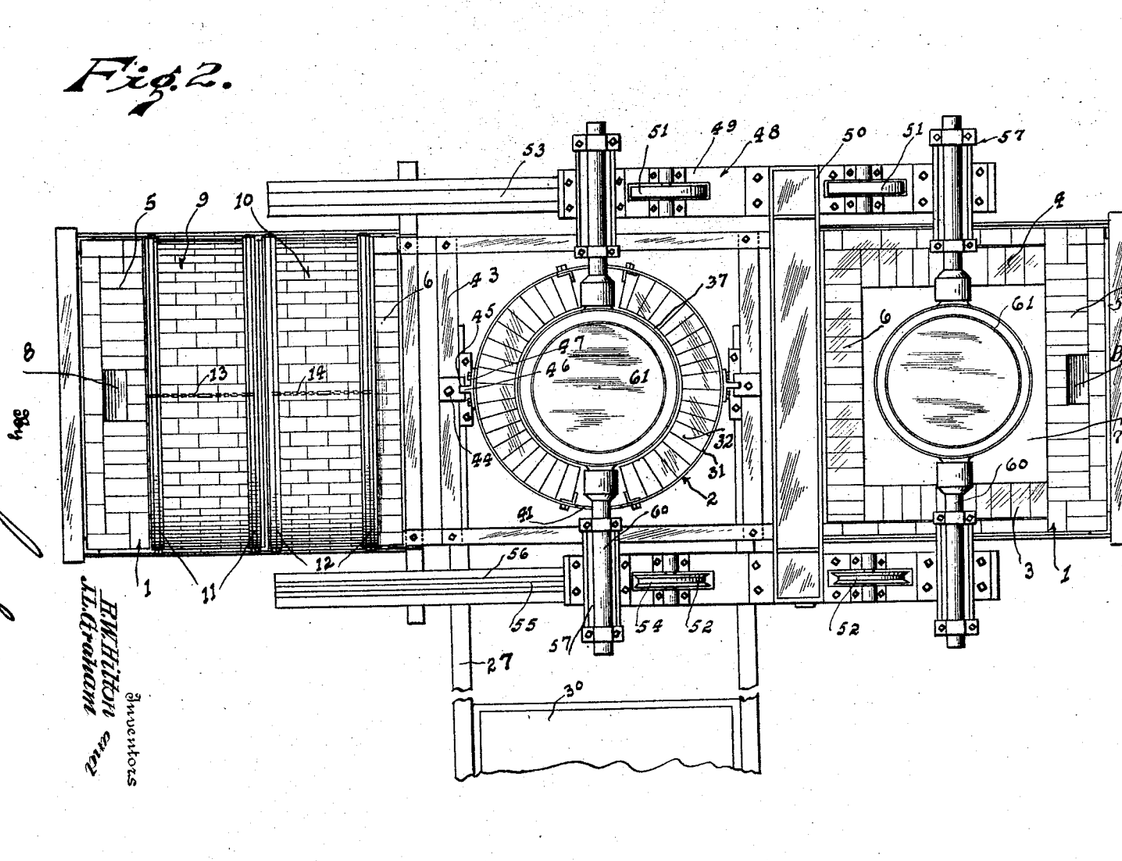
Figure 2 is a top plan view thereof, the arches of one of the draining furnaces being omitted for the sake of clearness.

Referring to Figures 1, 2 and 3 of the drawings, it will be observed that when the furnace 2 is in elevated position, the trunnions supporting either pot which may then be in drawing position, will be raised within the recesses 41 heretofore referred to so that the presence of the trunnions does not interfere with the pot being enclosed by the upper portion of the furnace and a uniform temperature thus maintained. Likewise it will be evident by reference to the said figures that when either pot is in draining position, its trunnions will be received within the recesses 16 in the ends of the arch 9 of the respective draining furnace so that these recesses will be substantially closed and there will be no appreciable escape of heated air currents about the trunnions of the pot.

Having thus described the invention, what is claimed as new is:

1. In apparatus of the class described, spaced draining furnaces open at their relatively adjacent sides, means for closing each furnace, a drawing furnace located between the draining furnaces, a truck supported for travel between the draining furnaces and with relation to the drawing furnace, the truck including side sills spaced to span the respective draining furnaces when the truck is at one or the other limit of its travel, bearings upon the sills, and pots having trunnions journaled in the bearings, the said bearings being of trough-like form whereby to contain a cooling fluid.

2. In apparatus of the class described, spaced draining furnaces, multiple pot-supporting means operable to alternately position the pots in operative relation to the respective draining furnaces, and a drawing furnace located between the draining furnaces and bodily movable upwardly and downwardly into and out of elevated position the furnace having a chamber in its top to enclose one of the supported pots when another pot is in operative relation to its respective draining furnace.

3. In apparatus of the class described, spaced draining furnaces, multiple pot-supporting means operable to alternately position the supported pots in operative relation to the respective draining furnaces, and a drawing furnace located between the draining furnaces and bodily movable to an elevated position, the said drawing furnace having a chamber in its top to enclose one of the supported pots when another pot is in operative relation to its respective draining furnace and movable to a lowered position to permit of movement of the pot-supporting means to bring the first-mentioned pot to operative relation to the drawing furnace and the last-mentioned pot to operative relation to its respective draining furnace.

4. In glass apparatus, means for supporting a drawing pot, and a drawing furnace having a pot enclosing chamber in its top and movable with relation to the supporting means into and out of position to enclose, within the chamber, the pot supported by the said means.

5. In glass apparatus, means for supporting a drawing pot, a drawing furnace movable with relation to the supporting means into and out of position to enclose a pot supported by the said means, and means associated with the furnace affording a rest for the pot when the furnace is in the position stated.

6. In glass apparatus, means for supporting a drawing pot, a drawing furnace movable with relation to the supporting means into and out of position to enclose a pot supported by the said means, a furnace having an open top, and means within the furnace constituting a rest for the rim of the pot when the furnace is in position to enclose the pot.

7. In glass apparatus, means for supporting a drawing pot, a drawing furnace having a chamber in its upper end of a diameter greater than that of the pot, and means for moving the furnace into and out of an elevated position receiving the said pot within its said chamber in spaced relation to the wall of the chamber.

8. In glass apparatus, means for supporting a drawing pot, a drawing furnace having an open upper end, and means for moving the furnace into and out of an elevated position receiving the said pot within its said open end, the furnace within its said end being provided with a circumscribing ledge providing a rest for the peripheral portion of the bottom of the pot when the furnace is in an elevated position.

9. In glass apparatus, means for supporting a drawing pot, a drawing furnace having an open upper end, means for moving the furnace into and out of an elevated position receiving the said pot within its said open end, the furnace within its said end being provided with a circumscribing ledge providing a rest for the peripheral portion of the bottom of the pot when the furnace is in an elevated position, and a ring of heat insulating packing material upon the said ledge.

10. In glass apparatus, means for supporting a drawing pot, a drawing furnace, means guiding the furnace for vertical movement, the said furnace having an open top to receive and enclose a pot supported by the said means when the furnace is in an elevated position, and means for elevating and lowering the said furnace.

11. In glass apparatus, a draining furnace open at its top at one side, an arch movable into and out of position to close the said open side and top of the furnace, and pot-supporting means operable to introduce the pot supported thereby into the furnace and support the same while the arch is in closing position.

12. In glass apparatus, a draining furnace having an arched top, one section of which is movable into and out of closing position, another section of the said top having oppositely located recesses, one side of each of which is to be closed by a portion of the first-mentioned top section when the latter is in closing position, and pot-supporting means operable to introduce a pot supported thereby into the furnace and having portions receivable within the said recesses when the pot is in position within the furnace and the first-mentioned section of the furnace top is in closing position.

13. In glass apparatus, a draining furnace open at its top at one side, one wall of the furnace at the other side being extended above the open top, an arch positioned beside the wall extension and closed at one side thereby, an arch movable into and out of position resting beside the other side of the first-mentioned arch and having a wall closing its other side, and pot-supporting means operable to introduce a pot supported thereby into the furnace and support the same while the last-mentioned arch is in closing position.

14. In glass apparatus, a draining furnace open at its top at one side, one wall of the furnace at the other side being extended above the open top, an arch positioned beside the wall extension and closed at one side thereby, an arch movable into and out of position resting beside the other side of the first-mentioned arch and having a wall closing the other side, and pot-supporting means operable to introduce a pot supported thereby into the furnace and support the same while the last-mentioned arch is in closing position, the said open side of the first-mentioned arch being recessed, and the said pot-supporting means including pot-supporting elements receivable within the recesses.

15. In glass apparatus, a draining furnace open at its top at one side, one wall of the furnace at the other side being extended above the open top, an arch positioned beside the wall extension and closed at the side thereby, an arch movable into and out of position resting beside the other side of the first-mentioned arch and having a wall closing its other side, and pot-supporting means operable to introduce a pot supported thereby into the furnace and support the same while the last-mentioned arch is in closing position, the said wall extension of the furnace being provided with an outlet flue having its intake end communicating with the interior of the furnace beneath the first-mentioned arch.

16. In glass apparatus, a draining furnace open at its top at one side, one wall of the furnace at the other side being extended above the open top, an arch positioned beside the wall extension and closed at the side thereby, an arch movable into and out of position resting beside the other side of the first-mentioned arch and having a wall closing its other side, pot-supporting means operable to introduce a pot supported thereby into the furnace and support the same while the last-mentioned arch is in closing position, and sway rods pivotally connected with the wall extension of the furnace and with the last-mentioned arch.

17. In glass apparatus, a draining furnace, a drawing furnace, and a pot carriage movable with relation to the furnaces whereby to alternately position a pot carried thereby within the draining furnace and in operative relation to the drawing furnace, said carriage comprising spaced side sills and a box beam connecting the sills and having its open side presented upwardly to adapt it to contain a cooling fluid.

18. In glass apparatus, in combination with means for tiltably and shiftably supporting a drawing pot, means operating below the pot when the latter is in drawing position and movable upwardly with relation to the pot and into engagement therewith to level the pot and support and maintain the same in level position.

19. In glass apparatus, means for supporting a drawing pot, and a drawing furnace arranged beneath the pot and movable upwardly with relation thereto to enclose the pot and engage the same in a manner to level and support and maintain the pot in level position.

In testimony whereof we affix our signatures.

ROBERT W. HILTON. [L. S.]
JOHN L. GRAHAM. [L. S.]